BONE-CONDUCTION ALL-IN-ONE TRANSISTOR AMPLIFIER HEARING AID

Filed Dec. 8, 1958 5 Sheets-Sheet 1

INVENTOR.
H.A.Pearson by Greene, Pineles & Durr
ATTORNEYS

BONE-CONDUCTION ALL-IN-ONE TRANSISTOR AMPLIFIER HEARING AID

Filed Dec. 8, 1958 5 Sheets-Sheet 2

INVENTOR.
H. A. Pearson by Greene, Pineles & Durr
ATTORNEYS

*INVENTOR.*
H. A. Pearson by Greene, Pineles & Durr
ATTORNEYS

INVENTOR.
H. A. Pearson by Greene, Pineles & Durr
ATTORNEYS

INVENTOR.
H.A. Pearson by Greene, Pineles & Durr
ATTORNEYS

United States Patent Office 3,030,455

Patented Apr. 17, 1962

3,030,455

BONE-CONDUCTION ALL-IN-ONE TRANSISTOR AMPLIFIER HEARING AID

Harry A. Pearson, 13 Salem Place, White Plains, N.Y.

Filed Dec. 8, 1958, Ser. No. 778,991
7 Claims. (Cl. 179—107)

This invention relates to all-in-one bone-conduction transistor hearing aids wherein all their elements including the microphone, the transistor amplifier with its energizing battery cell, together with a bone-conduction receiver, are combined within a casing enclosure into a single miniature-size unit having an over-all volume small enough to be worn inconspicuously behind the ear of the user with the vibration-transmitting bone-contacting wall of the bone-conduction receiver held against a bony part of the head for transmitting thereto audio-frequency vibrations which enable the user to hear the amplified picked-up sound by bone conduction. In practice, the bone receiver of such bone-conduction hearing aid has to be driven by a transistor amplifier operating with a gain of the order of 90 decibels and a power output of several milliwatts, in the case of a spectacle-carried bone receiver. A head-band-carried hearing bone receiver may be operated with a higher amplifier output as high as 100 milliwatts. Accordingly, it is essential to suppress feedback of the vibrations and acoustic excitation of the so-driven bone receiver to the microphone, for assuring that the over-all vibration and acoustic feedback from the bone receiver to the microphone is insufficient to set up self-sustained oscillations and whistling.

It is understood that as used in the specification and claims herein, the expression "suppress" is intended to mean attenuation of an undesirable action to a degree sufficient for securing the desired over-all effect.

Among the objects of the invention is an all-in-one hearing aid of the foregoing type wherein feedback of vibrations and acoustic excitation from the bone receiver to the microphone is maintained below a level at which such feedback might set up self-sustained oscillations and whistling. In accordance with a broad phase of the invention, a casing enclosing the bone receiver and forming part of the mechanical structure carrying and housing the microphone and the amplifier with its energizing battery cell of an all-in-one hearing aid, has a casing wall with a casing opening through which the bone-contacting member of the bone receiver is exposed for engagement under pressure with the hearing-inducing bones of the user, with the bone-coupling member and the bone receiver being carried along the casing opening by a resilient looplike vibration barrier which joins the peripheral region of the bone-coupling member to the casing edge region of the casing opening while the looplike vibration barrier suppresses transmission of vibrations from the bone receiver and its bone-coupling member to the casing of the hearing aid and any other associated mechanical structures carrying the microphone and the amplifier elements of the hearing aid.

In accordance with a specific form of the invention, a casing wall—of a tiny casing housing and combining therein all operating elements of a bone-conduction hearing aid, and small enough for inconspicuous wear behind the external ear in the vicinity of the mastoid bone—has a relatively extended resilient and yieldable elastomer wall of virbation-dissipating elastomer material which carries on an intermediate or central elastomer wall section thereof essentially all operating elements of the bone receiver for transmitting through the central elastomer wall section the hearing-inducing inertia reaction vibrations of the internally-carried bone receiver to the hearing-inducing bones of the user's head, while the peripheral region of the elastomer wall surrounding its central bone-coupling wall section suppresses transmission of the bone-receiver vibrations to the surrounding relatively rigid casing walls of the hearing-aid casing and assures that the over-all vibration and acoustic feedback from the bone receiver to the microphone is below the level that would cause generation of sustained oscillations and whistling. The tiny casing of such all-in-one bone-conduction hearing aid of the invention may be carried behind the user's external ear, either by the rear part or bow of a temple of the user's spectacles, or by a headband, or in general, by any of the supports used for holding the known bone-conduction receivers in vibration-transmitting contact engagement with the mastoid bone of the user.

A phase of the invention relates to bone-conduction receivers which are combined with means for cutting off their high-frequency response above frequencies important for intelligible reproduction of speech.

Hawley Patent 2,202,906, assigned to Bell Telephone Laboratories, discloses a bone receiver having a special internal spring and mass elements for causing the bone receiver to operate as a mechanical band-pass filter in cutting off high frequencies above about 3000 c.p.s. (cycles per second). Knauert Patent 2,832,842 discloses and claims a greatly simplified and more effective bone receiver wherein the desired band-pass filter action is obtained by joining the bone-contacting casing wall to the receiver casing through resilient junction means whereby the contact wall vibrates with its own resonant frequency between about 2000 and 6000 c.p.s., and the bone receiver operates as a mechanical band-pass filter which attenuates the response above such resonant frequency.

Among the objects of the invention is such bone receiver which is even simpler in construction than the bone receiver of Knauert Patent 2,832,842, and which may be provided with a casing all walls of which are rigidly joined or united to each other while securing the desired band-pass filter action which cuts off the undesirable high-frequency response.

In accordance with this phase of the invention, the bone-coupled portion of the internal vibratory transducer structure of such bone receiver is joined to a wall of the relatively rigid bone-contacting receiver casing by a resilient elastomer junction body portion which is arranged so that when the casing wall is held coupled to the user's bones across the skin, the resilient elastomer junction body portion forms in conjunction with the other elements of the bone receiver a band-pass filter which cuts off the high-frequency response above a selected high frequency, such as between 2000 and 6000 c.p.s.

The foregoing and other objects of the invention will be best understood from the following description of exemplifications thereof, reference being had to the accompanying drawings, wherein.

Figures 1, 2, 3, 4:
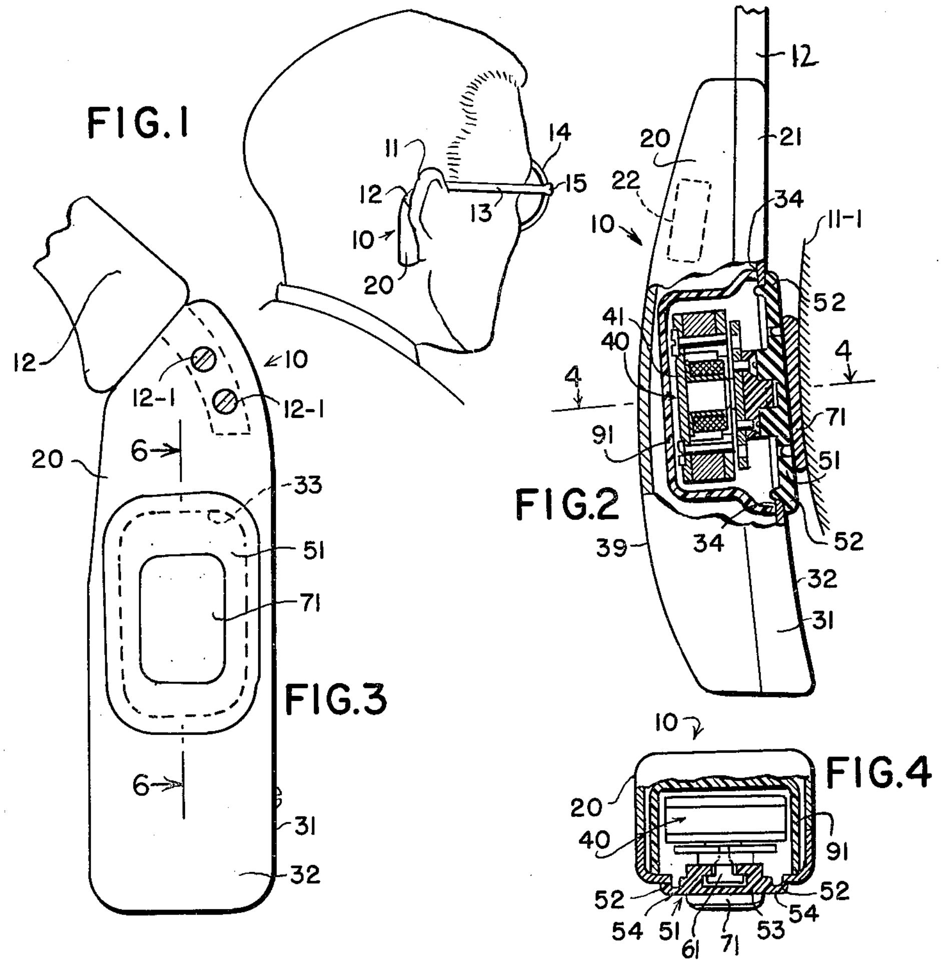
FIG. 1 is an elevational view of an all-in-one bone-conduction hearing aid of the invention as it is worn on the temple bow of a spectacle frame behind the ear of the user.
FIG. 2 is a side view on an enlarged scale, with a part in cross-section, of the tiny encased all-in-one bone-conduction hearing aid shown in FIG. 1.
FIG. 3 is a view on the same scale of the same encased hearing aid as seen from the bone-contacting side thereof.
FIG. 4 is a partial cross-sectional view of the encased hearing aid along lines 4—4 of FIG. 2.

Referring to FIGS. 1–4, the all-in-one bone conduction hearing-aid unit of the invention generally designated 10, has all of its elements enclosed in a tiny casing 20 the over-all dimensions of which are small enough so that it may be worn unobtrusively behind the external ear 11 of the user's head with the bone-contacting wall of its bone receiver engaging the user's mastoid bone for enabling him to hear by bone conduction. The hearing-aid unit 10 is shown held along the mastoid bone behind the external ear of the user by attaching its upper casing end 21 to the rear end or bow 12 of a temple 13 of spectacle frame 14 of conventional spectacles worn by the user. As indicated in FIG. 3, an end of the temple bow 12 fits into a nest of the upper casing end 21 and is suitably secured thereto, as by two screws so that the temple may press the casing contact wall toward contact engagement with the bones of the user's head. The temple 13 is connected to the spectacle frame by the usual hinge connection 15. Each of the two temples of such spectacle frame may carry and hold coupled such all-in-one bone-conduction hearing aids 10 of the invention to the bones on opposite sides of the user's head. Instead of carrying the bone-conduction hearing aid 10 on the rim bow of a spectacle, the upper end of its casing 20 may be attached to the end of a spring headband held on the head of the user, for instance in the way conventional bone receivers are worn and held pressed against the mastoid bone, as described, for instance, in U.S. Patent Re. 21,030. In general, any of the supports used for holding bone receivers in vibration-transmitting contact engagement with the mastoid bone of the user, may be used for holding the all-in-one bone-conduction hearing aid 10 coupled to the mastoid bone behind the external ear of the user.

The tiny casing 20 of the all-in-one bone-conduction hearing aid 10 so worn behind the ear of the user, encloses and combines therein all the operating elements and components of a bone-conduction hearing aid, including a microphone, a multi-stage transistor amplifier with its energizing battery, and a bone receiver which transmits hearing-inducing vibrations to the bones of the user for enabling him to hear by bone conduction. Without thereby in any way limiting the invention thereto, there will now be described in connection with the circuit diagram of FIG. 5, by way of example, all operating elements and components of a bone-conduction hearing aid combined within the tiny casing 20 shown in FIGS. 1–4.

Figure 5:
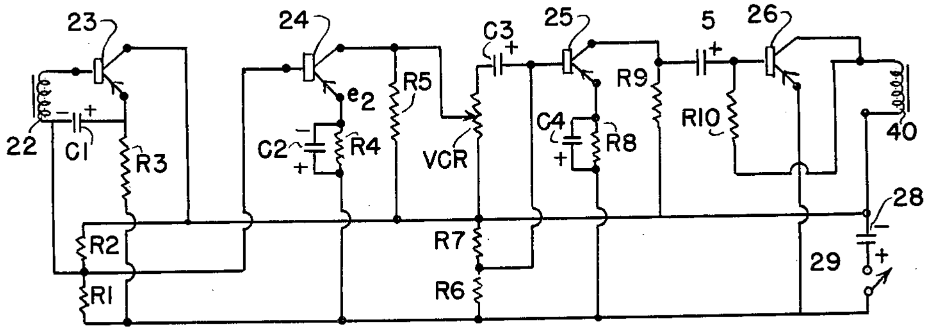
FIG. 5 is a circuit diagram of all operative elements of the encased all-in-one bone-conduction hearing aid shown in FIGS. 1–4.

Referring to FIG. 5, the casing 20 encloses and combines therein a microphone 22, the output of which is impressed on a transistor amplifier having four transistors 23, 24, 25, 26, which supplies the amplified microphone output to bone receiver 40. The circuits of all four transistors 23–26 are energized from a single energy source consisting of a tiny battery cell 28 which may be connected to or disconnected from the transistor circuits by switch 29. The microphone 22 has an electromagnetic sound-energy transducer of the type described in U.S. Patent 2,432,424, and is of miniature size, such as described and claimed in the copending application of W. F. Knauert, Serial No. 774,438 filed November 17, 1958.

The microphone output is impressed on the base and emitter of the transistor 23 of the first amplifier stage. The amplified output of the first amplifier stage is impressed on the base and emitter of transistor 24 of the second amplifier stage. The amplified output of the second amplifier stage is impressed on the base and emitter of transistor 25 of the third amplifier stage. The amplified output of the third amplifier stage is impressed on the base and emitter of transistor 26 of the last or output amplifier stage. The base and emitter of transistors 23, 24 have applied thereto proper direct-current bias by their shown circuit connection to the voltage-dividing resistances R1, R2, which are connected between two opposite-polarity battery leads from the opposite terminals of battery cell 28. The base and emitter of third transistor 25 have applied thereto proper direct-current bias by their shown circuit connections to the voltage-dividing resistances which are similarly connected between the opposite-polarity battery leads. The amplifier circuits of the first transistor 23 include emitter resistance R3 and coupling capacitor C1. The amplifier circuits of the second transistor 24 include emitter resistance R4 which is bypassed by capacitor C2 and collector resistance R5 which is connected to the movable tap of the volume control resistance VCR. The amplifier circuits of the third transistor 25 include emitter resistance R8 which is bypassed by capacitor C4, collector resistance R9, and coupling capacitor C5 through which it is coupled to the next output amplifier stage of transistor 26. The circuits of the fourth transistor 26 include base resistance R10 through which proper direct-current bias relations are maintained between its base and emitter.

To enable ready practice of the invention, and without thereby in any way limiting its scope, there are given below, by way of example, data about the various circuit elements of the amplifier shown:

Battery cell of 1.3 volts. Transistors 23, 24 are Raytheon 891, and transistors 25, 26 are Raytheon 892 transistors. Alternatively, all transistors are Philco M–1 transistors.

| Resistances: | K ohms |
|---|---|
| R1 | 6.8 |
| R2 | 15.0 |
| R3 | 1.5 |
| R4 | 1.5 |
| R5 | 1.5 |
| R6 | 10.0 |
| R7 | 18.0 |
| R8 | 1.2 |
| R9 | 1.5 |
| R10 | 22.0 |
| VCR | 20.0 |

| Capacitors: | |
|---|---|
| C1 | 4 mfd., 4 v. tantalytic. |
| C2 | 8 mfd., 2 v. tantalytic. |
| C3 | 4 mfd., 4 v. tantalytic. |
| C4 | 1 mfd., 4 v. tantalytic. |
| C5 | 1 mfd., 4 v. tantalytic. |

In the form of the invention show in FIGS. 1–10, all of the above-described elements or components of the complete multi-stage transistor amplifier hearing aid shown diagrammatically in FIG. 5, including the bone receiver 40 described in more detail hereinafter, are housed and combined within the tiny elongated or oblong casing 20 of a size and shape with fits inconspicuously behind the external ear adjacent the mastoid bone of the user. Referring to FIGS. 2–4, the casing 20 consists of a hollow bottom or contact casing section 31 with a casing contact wall 32 and a complementary hollow top or cover casing section 39, which enclose on all sides the interior casing space. Each of the two casing sections 31, 39 is formed, as by drawing with suitable drawing dies, out of stainless steel stock about .010″ thick, so as to give the walls of each hollow casing section a relatively high degree of rigidity and resistance to deformation. The two hollow casing sections 31, 39 are suitably joined to each other along mating edge surfaces or edges 38 of their side walls or rims. This may be done by fastening elements such as screws (not shown) passing through fastening holes of the cover section 39 and engaging fastening elements extending from or secured to wall portions of the contact casing section 31.

All components of the bone-conduction hearing aid described above in connection with the diagram of FIG. 5, except the bone-conduction receiver 40, are suitably supported and mounted in the interior of the casing 20 on chassis frame portions (not shown) which are suitably affixed to the casing 20. The tiny rectangular microphone 22 may be suitably mounted on the chassis, for instance, in the casing space indicated in FIG. 2, being suitably suspended, for instance by a plurality of Z-shaped suspension members of elastomer sheet material, each having one elastomer end arm secured, as by cement, to the exterior of the microphone 22, and the opposite elastomer end arm secured to a chassis support thereof. Since the details of the mounting of the hearing-aid components other than the bone-conduction receiver do not form part of the present invention, they need not and will not be described herein in more detail.

The casing contact wall 32 of casing bottom section 31 is arranged to overlie and be pressed against the underlying bones of the head. On an intermediate part of the casing contact wall 32 is carried the bone-conduction receiver 40 in such a way as to suppress transmission vibrations and acoustic excitation thereof to the microphone 22 to a degree required for assuring that the over-all vibration and acoustic feedback from the bone receiver 40 to the microphone 22 is insufficient or below the level required for setting up sustained electric oscillations and whistling that would destroy the usefulness of the hearing aid.

An all-in-one bone-conduction hearing aid of the invention of the type described above, may embody a bone-conduction receiver operating with any of the known types of electromechanical transducer structures, such as piezoelectric, or dielectrostrictive transducer structures. The present invention will be explained in connection with a known electromagnetic transducer structure of the type generally used in conventional inertia-reaction bone-conduction receivers.

Figures 6, 7, 8:
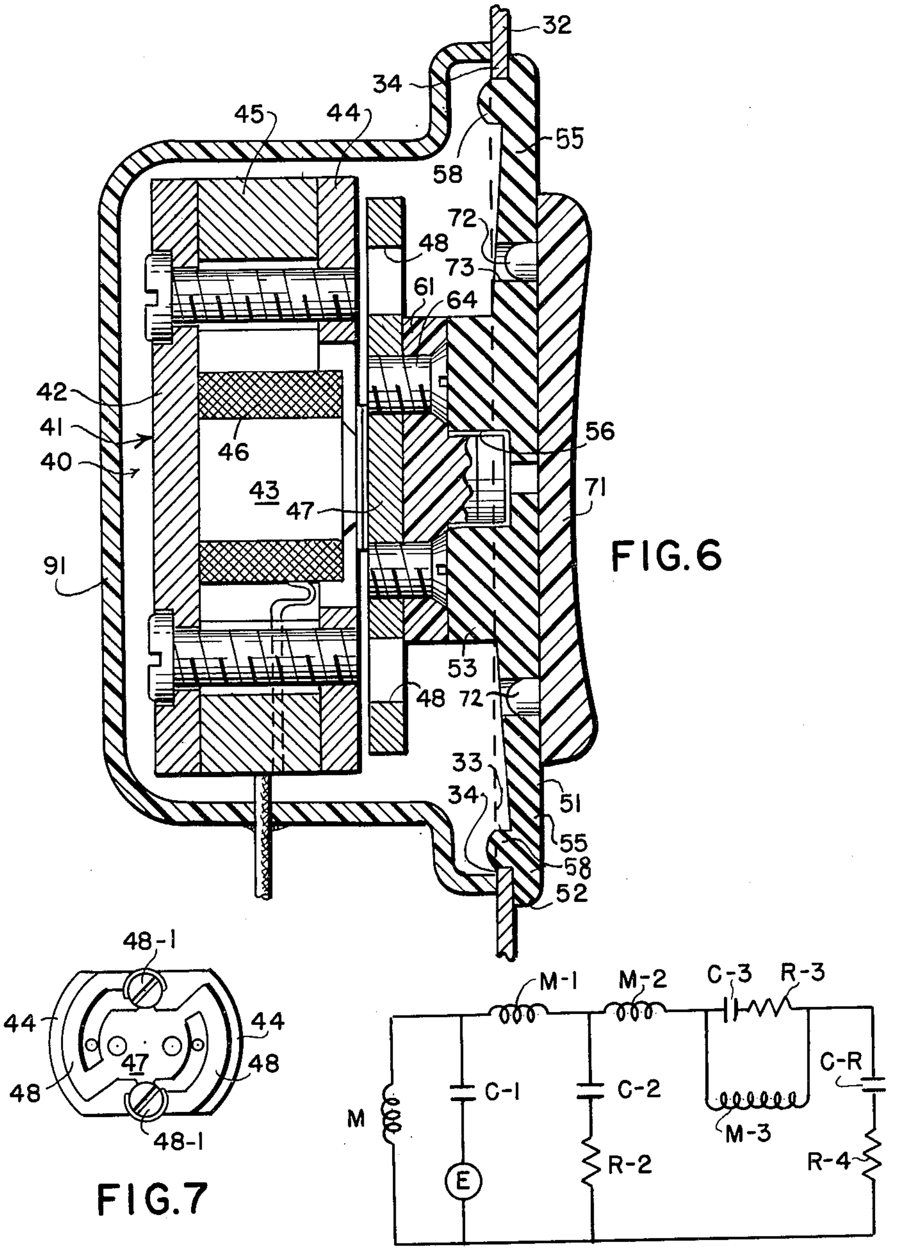
FIG. 6 is a cross-sectional view along lines 6—6 of FIG. 3, showing the bone-receiver part of the hearing-aid casing.
FIG. 7 is a bottom view of the electromagnetic transducer of the bone receiver of FIG. 6, as seen from the downward side of this figure.
FIG. 8 is an analogous electric circuit of constants which represent the operative relationship of the bone-receiver transducer to the elements through which it is joined to the casing of the all-in-one bone-conduction hearing aid on which it is carried.

Referring to FIGS. 6 and 7, the bone-conduction receiver 40 operates with an electromagnetic transducer comprising a floating, resiliently-carried ferromagnetic structure 41 of substantial mass, consisting of a yoke plate 42 having a central core pole 43, a pole plate 44, and permanent magnetic core elements 45 held clamped, as by the two screws shown, between the yoke plate 42 and the pole plate 44. The core pole 43 has a pole end passing through an opening in the pole plate 44 and is surrounded by transducer windings 46 so that when energized by audio-frequency currents, corresponding magnetic flux fluctuations will be induced between the pole end of core pole 43 and the surrounding pole plate 44. The magnetic structure 41 is resiliently carried in a floating vibratory condition by magnetic armature 47 at a small gap spacing from the end of core pole 43 (FIG. 6). The armature 47 has two opposite arc-shaped resilient armature junction arms 48 the ends of which are secured, as by clamping screws 48–1, to spaced portions of the pole plate 44 across suitable spacer shims so that the armature 47 resiliently carries at a minute air-gap spacing the overlying magnetic core 41 in a floating vibratory condition and causes it to impart to the armature 47, and therethrough to the bones of the user, hearing-inducing vibrations corresponding to the electric oscillations in transducer windings 46.

In the electromagnetic bone-receiver transducer described above in detail in connection with FIGS. 5 and 6, the relatively large-mass portion of magnetic structure 41 with the transducing windings 46 is resiliently carried in a floating, vibrating condition by the bone-coupled smaller-mass portion of armature 47 for imparting thereto and therethrough to the bones of the user, inertia-reaction vibrations and induce hearing by bone conduction. In conventional bone receivers of the foregoing type, a rigid casing contact wall of a rigid casing enclosing the vibratory transducer structure 40 and held in contact with hearing-inducing bones of the user, is secured, as by screws, to the bone-coupled mass portion of magnetic armature 47.

In an all-in-one bone-conduction transistor-amplifier hearing aid, the bone-coupled vibratory armature mass portion 47 of the bone receiver 40 has to be mounted on the body-contacting wall 32 of the hearing-aid casing 20 in such a way as to transmit the vibratory energy to the hearing-inducing bones of the user, while suppressing vibration and acoustic feedback from the bone-coupled armature 47 and other parts of the bone receiver to the microphone 22 and assure that the over-all vibration and acoustic feedback from the bone receiver 40 to the microphone 22 remains at all times below the level that would cause generation of sustained oscillations and whistling. It should be noted that if transmission of bone-receiver vibrations to the adjacent casing wall 32 are not properly suppressed and sufficient bone-receiver vibrations are imparted to casing wall 32 and the other walls of the casing 20, such casing vibrations will also be picked up by the air inside and outside the casing walls and acoustically transmitted to the microphone 22 which will also pick up vibrations that may be transmitted thereto by the casing walls. As explained in U.S. Knauert Patent 2,832,842, the best generally used bone receivers, when held coupled to the user's bones, operate with a response which has substantial output at frequencies above the range required for adequate speech reception, namely above about 3000 to 4000 c.p.s. For the reasons explained in said Knauert patent, it is highly desirable to suppress or attenuate such high-frequency bone-receiver vibrations, and the Knauert patent discloses a highly effective way of securing the desired suppression of such high-frequency bone-receiver vibrations.

A phase of the present invention provides means for securing smooth cut-off of the undesirable high-frequency bone-receiver vibrations without introducing undesirable peaked response near the upper cut-off frequency. This is accomplished by interposing an elastomer body portion between the internal vibratory bone-receiver system and the user's bones against which the receiver is held.

In accordance with a phase of the invention, this is achieved by making a relatively large section of the casing contact wall 32 of the hearing-aid casing 20 out of a wall body of elastomer material which carries on its intermediate or central region the bone-coupled armature mass portion 47 of the bone-receiver transducer 40, and therethrough the entire mass of bone-receiver transducer 40 in a floating condition, so as to permit efficient transmission of hearing-inducing vibrations from the bone-coupling mass portion 47 to hearing-inducing bones against which it is held, while surrounding elastomer body portions of the elastomer wall body suppress transmission of vibrations and acoustic excitation from the bone receiver 40 to the contact casing wall 32 and other casing portions of the hearing-aid casing 20 to a degree sufficient for maintaining the over-all vibratory and acoustic feedback to the microphone below a prohibitive level at which feedback oscillations and whistling start. In addition, the central elastomer body portion through which the vibrations are transmitted to the user's bones is designed to form an essential part of a mechanical band-pass filter which secures smooth cut-off of the undesirable high-frequency bone-receiver vibrations without introducing undesirable peaked response near the upper cut-off frequency.

Figure 9:
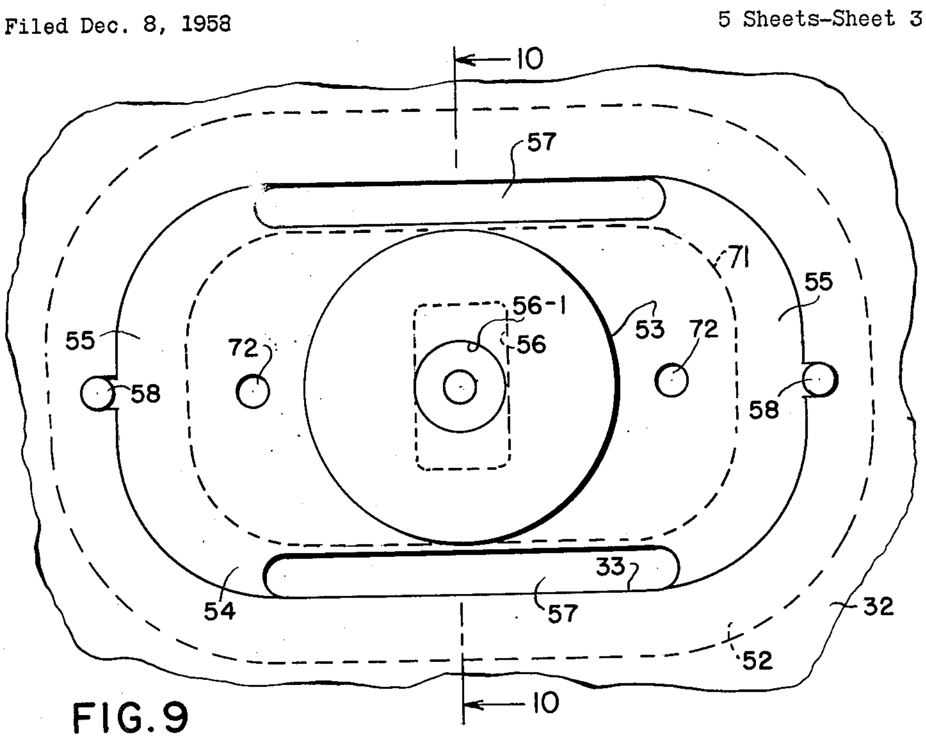
FIG. 9 is a top view of the elastomer wall on which the bone-receiver transducer is carried together with the bone-receiver junction member and a portion of the surrounding casing wall, as seen from the upper side of FIG. 6.
Figure 10:
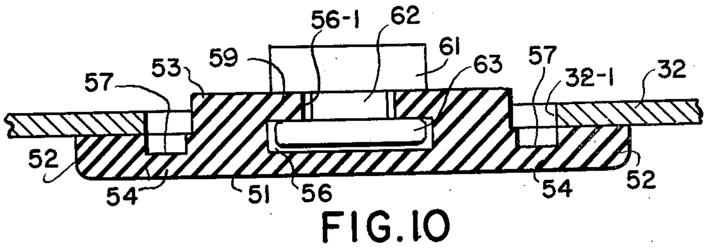
FIG. 10 is a cross-sectional view of the elastomer wall along line 10—10 of FIG. 9, without the bone-receiver transducer.
Figure 11:
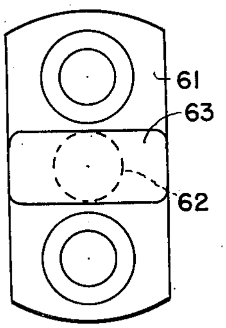
FIG. 11 is a top view of the junction member which joins the bone-receiver transducer unit to the elastomer wall, as seen from the downward side of FIG. 10.

The principles of the present invention will now be described by way of example in connection with one form of effective vibration-decoupling connection from the bone-coupled mass portion of a bone receiver to the casing contact wall of an all-in-one bone-conduction hearing aid on which it is carried, as shown in FIGS. 6 and 7, and in detail in FIGS. 9–11. The rigid contact casing wall 32 of the all-in-one hearing aid casing 20 has a relatively large casing opening 33 along the region of the contact wall 32 which overlies the mastoid bone region of the user's head when the all-in-one hearing-aid casing 20 is held coupled thereto behind the external ear of the user. A vibration-decoupling elastomer wall body 51 of resilient, stretchable elastomer material has an area large enough to cover casing opening 33 and to overlap with its peripheral border region 52 the peripheral casing-opening border or edge region 34 adjoining the large casing opening 33. The casing opening 33 of casing contact wall 32 is of oblong shape corresponding to the oblong shape of the bone receiver transducer 40. The casing opening may be large enough so that the transducer 40 may pass through the casing opening 33 into the interior of the hearing-aid casing 20 or be removed therefrom. The vibration-decoupling elastomer wall body 51 is of similar oblong shape, and its border region 52 is secured, as by cement, to the overlapped casing-opening edge region 34.

The large-area elastomer decoupling wall body 51 has at its intermediate or central region (FIGS. 5–10) a thicker bone-coupling elastomer body section 53 shown as a boss projection extending above the level of its surrounding thinner, elastically-yieldable elastomer junction wall sections 54, 55, which separates the bone-coupling elastomer body section 53 from the border region 52 which is affixed to the casing-opening edge 34. The thin, elastically yieldable elastomer junction wall sections 54, 55 of the elastomer wall body 51 thus constitute a continuous elastomer vibration barrier which surrounds or encircles all sides of the thicker central bone-coupling elastomer body section 53. This continuous elastomer vibration barrier, formed of elastomer wall sections 54, 55, is shaped and designed to have such elastic yieldability and vibration-absorbing or dissipating capacities, as to cause these elastomer wall sections 54, 55 to suppress transmission of bone-receiver vibrations from the surrounded bone-coupling elastomer body section 53 to the surrounding casing-opening edge region 34 and other portions of casing 20.

To give the required elastic yieldability to the elongated elastomer wall junction sections 54 extending parallel to the longer borders of the elastomer wall body 51, they are provided with longitudinal depressions 57, thereby reducing their average thickness below the thickness of the other two elastomer wall junction sections 55. To facilitate ready alignment of the elastomer wall body 51 with respect to the casing-opening edge 34 to which they are secured, two peripherally spaced portions of the elastomer wall border 52 are provided with aligning projections 58 shaped to enter into fitting, aligning engagement with aligning openings 35 formed along the edge 34 of the casing opening 33 (FIGS. 6–9).

The central thick bone-coupling elastomer body section 53 of elastomer decoupling wall 51 has affixed to its inwardly-facing side and carries on the interior thereof, the bone-coupling vibratory armature portion 47 together with the floating vibratory transducer mass 41 of bone receiver 40. Any suitable means may be used for securing the bone-coupled armature 47 of the transducer 40 to the interior side of the bone-coupling elastomer body portion 53 of the elastomer decoupling wall 51.

As will be explained hereinafter in connection with the analogue of FIG. 8, this central bone-coupling elastomer body section 53 forms an essential part of the high-frequency cut-off filter mesh or section of the mechanical band-pass filter embodied in the bone receiver of the invention shown in FIGS. 1–10.

Referring to FIGS. 6–11, in the specific form shown, the bone-coupled armature 47 of bone-receiver transducer 40 is affixed to the inward side of the central bone-coupling elastomer body section 53 by a relatively rigid integral junction member 61. Junction member 61 is affixed to the overlying bone-coupling transducer armature 47 and is connected through a neck 62 to an anchor section 63 thereof which is embedded in or secured in clamping, overlapping engagement with interior body portions of the central bone-coupling elastomer body section 53. The junction member 61 engages with and has an area of the same order or slightly smaller than the overlying area of transducer armature 47, and they are secured to each other along flat interfitting surfaces. The upwardly-facing surface of junction member 61 is shown held clamped and affixed to the overlying transducer armature 47 by two flat-head screws 64, the flat heads of which are sunk in suitable tapered openings of junction member 61 (FIG. 6) so that they do not project above the surrounding surface of junction member 61. The anchor section 63 of junction member 61 has substantially the same lateral dimensions as the overlying junction member 61, and their neck 62 has the same width as the smaller lateral dimension of junction member 61 and its anchor section 63. The downwardly-facing surface of junction member 61 as seen in FIG. 6, is shaped to fit and engage with its entire area, the upwardly-facing end surface of the central elastomer coupling body section 53 to which it is secured by its anchor section 63.

The anchor section 63 of junction member 61 is arranged so as to clampingly enter a junction compartment 56 of central bone-coupling elastomer body section 53 through a narrow neck compartment 56–1 thereof and clampingly engage the overlying elastomer compartment wall portions 55. The elastomer-body junction compartment 56 and neck compartment 56–1 are so shaped and dimensioned as to enable elastic deformation of the elastomer compartment wall portions 55 when anchor section 63 of rigid junction member 61 is forced through narrower neck compartment 56–1 into the junction compartment 56 of central bone-coupling elastomer body section 53 for overlapping clamping engagement with the inner surfaces of its elastomer wall portions 55. After junction member 61 is secured to the bone-receiver 40, as by screw connections to its armature 47, the junction anchor section may be forced into the elastomer body junction compartment 56 as follows:

One of the laterally projecting ends of the junction-member anchor section 63 is inserted into the neck opening 56–1 of the central bone-coupling elastomer body section 53, whereupon the adjoining elastomer-compartment wall portions 55 are elastically flexed by anchor section 63 until the entire anchor section 63 is forced through the narrow neck opening 56–1 into the junction compartment 56 of the central bone-coupling elastomer body section 53 directly behind the elastomer-compartment wall portions 55. The elastomer-compartment wall portions 55 have a thickness somewhat greater than the height of the junction neck 62 of junction member 61 for causing the anchor section 63 to maintain the downwardly-facing surface of junction member 61 clamped against the facing end surfaces of central bone-coupling elastomer body portion 53 and its compartment wall portions 55. Before forcing the wider junction-member anchor section 63 into elastomer-body junction compartment 56, suitable cement is applied to the interior surfaces of the junction compartment 56 which are engaged by the junction member 61, so that after the junction-member anchoring section 63 is forced into the junction compartment 56, the anchoring section 63 with its neck 62 as well as the overlying downwardly-facing surface of coupling member 61, as seen in FIG. 10, will be united to the adjacent surface portions of central bone-coupling elastomer body section 53. Although it may be formed out of metal, good results are obtained with a junction member 61 formed of a suitable resin such as nylon. Any of the known adhesives suitable for joining elastomer and resin bodies to each other, may be used, as a cement for joining the junction member 61 to the bone-coupling elastomer body section 53. Good results are obtained with the commercially available thermoplastic cement supplied by B. F. Goodrich & Company under the name "Vulcalock G."

To the exterior surface of the elastomer wall body 51, which underlies the central region of the bone-receiver 40, is secured, as by cement, a relatively rigid or hard contact wall 71 through which the hearing-inducing vibrations are transmitted from transducer 40 to the user's hearing-inducing bones. The hard coupling wall 71 may be of the oblong shape shown, and is secured to the overlying surface of the central region 53 of elastomer wall body 51 by cement. Any of the known cements may be used for this purpose. A very strong joint is obtained by the use of cement known as "Eastman 910" adhesive. To simplify proper alignment of the coupling wall 71, it has two widely spaced aligning projections or pins 72 shaped to fit and engage two correspondingly aligned openings 73 in the elastomer body wall 51.

The vibratory motion of the floating transducer structure 41 and the other parts of the bone-receiver transducer 40, will be picked up by the air in the interior of the hearing-aid casing and be acoustically transmitted to the microphone. To suppress such acoustic transmission from the transducer 40 through the air in the hearing-aid casing to the microphone 22 housed therein, the transducer 40 is enclosed on its interior side with a rigid inner hollow casing 91 for providing an acoustic barrier between the casing space in which the bone-receiver transducer 40 operates and the surrounding interior space of the all-in-one hearing-aid casing 20. Such rigid inner casing 91 is desirably made of metal. However, it may be made of resin. The acoustic-coupling-suppressing inner casing 91 is secured, as by cement, along its downwardly-facing edge, as seen in FIG. 6, to the inward surface of the casing opening edge region 34 to complete the acoustic seal separating the bone receiver space from the other space in the hearing-aid casing 20.

The operative relationship of the cooperating elements of the vibration-suppressing elastomer barrier loop 54, 55, its band-pass filter section 53, the bone-receiver 40 40 and the casing 20, may be represented by the electric circuit analogue of FIG. 8. In the circuit of FIG. 8, M is the effective mass of the floating large bone-receiver structure 41.

E is the driving force between the large floating bone receiver mass 41 and armature 47.

C–1 is the effective compliance of the spring element 38 of the armature spring 47 through which it is connected to the large floating mass 41.

M–1 is the effective mass of the armature 47.

C–2 and R–2 are the compliance and the mechanical resistance of the central elastomer filter body section 53.

M–2 is the effective mass of the bone receiver contact member 71.

M–3 is the effective mass of the casing 20 with its casing contact wall 32.

C–3 and R–3 are the compliance and the mechanical resistance of the looplike elastomer barrier section 54, 55 separating the bone-coupling central filter elastomer body section 53 from the casing edge.

C–4 and R–4 are the compliance and the resistance of the mastoid bone or the terminal impedance of the bone receiver.

In the electric filter-circuit analogue of FIG. 8, the inductance M–2 (the effective mass of contact wall 71) of the third filter mesh, and the shunting impedances C–2 and R–2 (the compliance and mechanical resistance of the central elastomer body section 53), determine the high-frequency cut-off with which the bone-receiver transducer operates. By designing the mass of contact wall 71 and the compliance of the elastomer body section 53 so that when held coupled to the bones of the user they vibrate with their own resonant frequency in the range between 2000 to 6000 c.p.s., relatively to the other elements of the system shown, the bone-receiver transducer 40 will operate essentially as a mechanical band-pass filter having an attenuated response which rolls off smoothly above such resonant frequency. In practice, good results are obtained by designing the central elastomer body section 53 so that when the bone-receiver contact wall 71 is held against the user's body, the central elastomer body section 53 will resonate with the bone-contacting wall 71 at a resonant frequency of about 4000 c.p.s., and assure efficient operation of the bone receiver over a frequency range slightly beyond this high-frequency resonance with the response attenuating and rolling off smoothly above 4000 c.p.s.

As seen in the electric filter analogue circuit of FIG. 8, the mass of the hearing-aid casing 20 with its casing wall 32 (which is represented by M–3 of the last mesh) is shunted by the looplike elastomer wall barrier section 54, 55 (represented by shunting circuit elements C–3, R–3) through which the bone-coupled transducer is connected to and is carried by the casing. In accordance with the invention, the loop-like elastomer body section 54, 55 (circuit elements C–3 and R–3 of FIG. 8) is so designed and proportioned as to cause the vibrations which are transmitted from source E to the user's body (represented by C–4, R–4) to bypass the casing 20 (or M–3 in FIG. 8) of the all-in-one hearing aid, thereby suppressing transmission of bone-receiver vibrations to the casing 20. In other words, the thin, looplike elastomer barrier section 54, 55 (C–3 and R–3 of FIG. 8) form a vibration shunt for the hearing-aid casing 20 (M–3 of FIG. 8), and this vibration shunt C–3, R–3, may be readily designed with a sufficiently great compliance as to shunt or bypass the vibrations around the hearing-aid casing M–3 and to suppress the transmission of the bone-transducer vibrations to the casing 20 to a degree sufficient to assure that the over-all vibration and acoustic feedback from the bone-receiver transducer to the microphone is below a level at which sustained oscillations and whistling are set up.

In the drawings of the present application, the bone-receiver transducer structure 40 shown in FIGS. 2–7 is of oblong shape, and the major dimension of this transducer structure 40 extends in a direction parallel to the major dimension of the elongated casing 20 of the all-in-one hearing aid 10. However, applicant's assignee is about to place on the market a bone receiver having only half the mass and volume of its heretofore manufactured bone receivers. Such smaller bone receiver may be mounted in an all-in-one hearing aid casing 20 of the type shown in FIGS. 1–10, so that the major dimension of the transducer structure 40 fits within and extends transversely to the major dimension of the elongated casing 20 of the all-in-one hearing aid shown.

Instead of providing the casing wall 32 of the all-in-one hearing aid 10 with an oblong casing opening 33 along which the bone-receiver transducer is carried, the casing opening 33 may be of circular or other shape and arranged so that the bone-receiver transducer structure 40 is carried along it by a looplike elastomer barrier section corresponding to the circuit elements C–2, R–2, of FIG. 8, and operating in the manner described above.

Instead of using an elastomer vibration-barrier loop, such as elastomer barrier loop 54, 55 described above, for suppressing vibration feedback from the bone receiver 40 to the hearing-aid casing structure 20, the vibration barrier loop may be made of any elastic material, such as plastic or metal material. In such case, the resistance R–3 of such vibration barrier loop (FIG. 8) has a negligible value in comparison with reactances of the corresponding metallic or like hard spring member represented by C–3 in FIG. 8. However, elastomer bodies have a lower modulus of elasticity than hard bodies of metal or hard plastic material. The lower modulus of elasticity of elastomer bodies makes it possible to provide an elastomer barrier loop, such as loop 54, 55 (FIGS. 2–10) with substantially greater energy-storing capacity for providing the compliance required to secure the desired effect with an all-in-one hearing aid of the same over-all dimensions.

The elastomer body portions of the central elastomer body section 53 which separate the armature 47 from the rigid bone-contacting member 71, form parts of a mechanical band-pass filter, represented by C–2 and R–2 in FIG. 8, and they are designed to cut off or attenuate high-frequency vibrations transmitted to the skull above the range required for intelligible reproduction of speech, such as above 3,000 to 5,000 c.p.s., a feature of great practical importance in a bone-conduction hearing aid. By using elastomer body portions such as body section 53, instead of the spring metal of Hawley Patent 2,202,906, or hard plastic wall material of Knauert Patent 2,832,842, for the portion of the mechanical band-pass filter represented by C–2 and R–2 in FIG. 8, this spring element of the band-pass filter may be designed with materially greater energy-storing capacity for securing the desired resonant frequency with the associated vibrating mass M–2 of the system (FIG. 8), within the same over-all dimensions of their combined structures. In addition, by using an elastomer body portion, such as body section 53, for band-pass filter element C–2, the desired smooth cut-off of undesirable high frequencies is secured without introducing undesirable peaked response in the frequency range corresponding to the resonant frequency of the filter mesh elements represented by M–2, C–2 and R–2 in FIG. 8.

Without in any way limiting the scope of the invention, but only in order to enable more ready practice thereof, there are given below, the principal data of one form of an all-in-one bone-conduction hearing aid exemplifying the invention described above, and having a bone receiver 40 extending with its major dimension transversely to the major dimension of casing 20 shown in FIGS. 1–11:

Total mass of the all-in-one bone-conduction hearing aid without the bone receiver, was 15 grams.

Casing 20 with maximum width at center of 21⁄32″, maximum height of 4⁄8″, and total length of 2⅜″.

Casing opening in casing wall 32 was ⅝″ wide along major axis and 7⁄16″ wide transversely thereto.

The resiliently-carried bone-receiver mass 41 of 7 grams, and armature mass of .4 gram.

Elastomer wall 51, .900″ in length and .610″ wide, Its central thick elastomer body section 53 was .180″ in diameter, its total thickness was .105″, and its elastic stiffness was $20 \times 10^6$ dynes/cm. (centimeter).

Thinner elastomer loop wall portions 54, 55 were of .055″ thickness, with their regions along longitudinal depressions 57 being .030″ thick and .450″ long. The stiffness of elastomer loop wall portions 54, 55 was about $1 \times 10^6$ dynes/cm., and may be as high as $20 \times 10^6$ dynes/cm.

The elastomer wall body 51 consisted of neoprene.

Contact wall 71, of .2 gram mass. Stiffness of skin at mastoid bone is on the average of $100 \times 10^6$ dynes/cm.

Various other modifications may be made in the arrangement of the invention for assuring the desired suppression of the over-all feedback of mechanical vibrations from the bone receiver to the microphone of an all-in-one hearing-aid casing or mounting structure on which they are mounted or carried. For instance, the bone-contacting wall such as contact wall 71 may be omitted, and the central elastomer body section 53 may be held pressed with its exterior surface against the hearing-inducing bones of the user, for transmitting thereto the hearing-inducing vibrations. To secure the desired band-pass filter high-frequency cut-off above a predetermined high-frequency, such as 4000 c.p.s., mass elements, for instance powder particles of a heavy metal, such as tungsten or molybdenum, may be arranged to be dispersed in the bone-coupled central elastomer body portion 53 so as to provide the mass element M–2 of the filter mesh which resonates with the compliance C–2 of the central elastomer section 53 (FIG. 8) at the desired frequency (4000 c.p.s.) above which the response of the receiver is attenuated or cut off, in the manner explained above. Alternatively, the thickness of central elastomer body portion 53 may be made sufficiently large so as to embody therein the required mass M–2.

The microphone 22 has a sound-pervious wall portion or passage (not shown) through which propagated sound will reach and excite it or its vibratory diaphragm for causing it to generate corresponding electric signals. The sound passage of the microphone is suitably joined as by an elastomer duct to a wall opening (not shown) of the casing 20, so that propagated sound will be transmitted to the microphone through the casing opening and cause it to generate corresponding electric signals, as described, for instance, in the co-pending Knauert application Serial No. 774,438, filed November 17, 1958.

In the arrangement of the invention described above in connection with FIGS. 2–11, the integral elastomer wall body 51 may be formed of two separate elastomer body members, for instance, one elastomer member corresponding to and having the shape of the central elastomer body section 53 for giving the bone-receiver high-frequency cutting band-pass filter response, and the other elastomer member corresponding to and having the shape of the looplike elastomer vibration barrier body consisting of elastomer wall portions 54, 55. Thus the central elastomer body section 53 may have lateral dimensions corresponding to the dimensions of the upper region thereof which is secured to armature junction member 61, the outward surface of the central elastomer body section being of the same limited lateral width and being secured, as by cement such as "Eastman 910" adhesive, to the central facing region of the rigid body-contacting member 71, which may have the same lateral dimensions as those shown in FIGS. 2, 3, 4 and 6.

The other looplike elastomer barrier member corresponding to the elastomer barrier loop consisting of loop sections 54, 55, may have a central opening the border region of which is secured, as by similar cement, to the facing peripheral region of the rigid contact member 71. The inner opening border region of the looplike elastomer wall body corresponding to elastomer loop sections 54, 55, may overlap and be secured to a peripheral border region of the rigid contact member 71 corresponding to the distance between its aligning pins 72 and its outer border edge, as seen in FIG. 6.

Conventional inertia-reaction receivers consisting of a casing and a vibratory transducer structure carried in the interior of a small casing held against the user's hearing-inducing bone body, may likewise be provided with an elastomer junction body through which the transducer is joined to and is carried in the interior of the bone-coupled casing so that the mass of the casing will vibrate in conjunction with the elastomer junction body at its own resonant frequency in the range between 2000 and 6000 cycles per second, whereby such bone receiver is caused to operate essentially as a band-pass filter having a smoothly attenuated response above such resonant frequency when the bone receiver casing is held in contact with the body.

Figure 12:
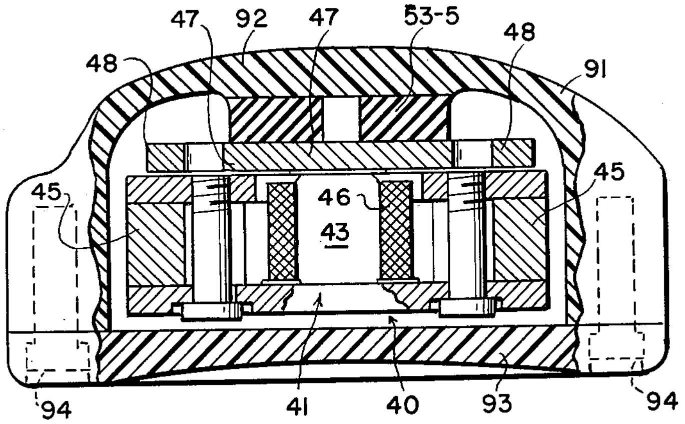
FIG. 12 is a cross-sectional view with parts in elevation, of a bone receiver embodying a novel band-pass filter higher-frequency cut-off arrangement of the invention.
Figure 13:
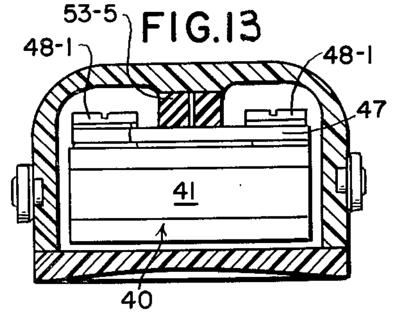
FIG. 13 is a cross-sectional view of the bone receiver seen in FIG. 12.

FIGS. 12 and 13 show one form of such bone receiver of the invention, which except for the modifications described below, correspond to FIGS. 6 and 10, respectively, of the above referred-to Knauert Patent 2,832,842. The bone receiver of FIGS. 12 and 13 has an electromechanical vibratory transducer structure 40 consisting of an armature 47 and a relatively heavy floating transducer structure 41 resiliently carried by armature 47, these elements being identical with the similarly numbered elements described in connection with FIGS. 1–11. The bone-receiver transducer 40 of FIGS. 12 and 13 is carried in the interior of a rigid casing consisting of a rigid hollow casing member 91 to which is secured as by screws 94 the rigid boundary of a rigid contact casing wall 93 so that the contact wall 93 forms a rigid part of the rigid casing enclosing on all sides the internal transducer structure 40. The bone or body coupled vibratory portion of the electromechanical transducer 40 consisting of armature 47, is joined to the rear wall 92 of hollow casing 91 by a relatively thick elastomer junction body 53–5 of elastomer material, this junction member corresponding to the central elastomer section 53 of the bone receiver described in connection with FIGS. 2–8. The elastomer junction body 53–5 may consist of a continuous homogeneous elastomer body layer joined with its opposite faces, as by a suitable cement such as "Eastman 910" adhesive, to the facing surfaces of the armature 47 and the inner face of casing wall 92. Alternatively, the elastomer junction member 53–5 may be provided with a central opening, as indicated in FIGS. 12 and 13, so that by varying the dimensions of the opening, the compliance of a junction elastomer body 53–5 of the same thickness may be controlled for determining the resonance with which the mass of the casing 91 vibrates in conjunction with the elastomer junction body 53–5 relatively to the other elements of the transducer structure 40 when operating with the desired band-pass filter characteristics.

Figure 14:
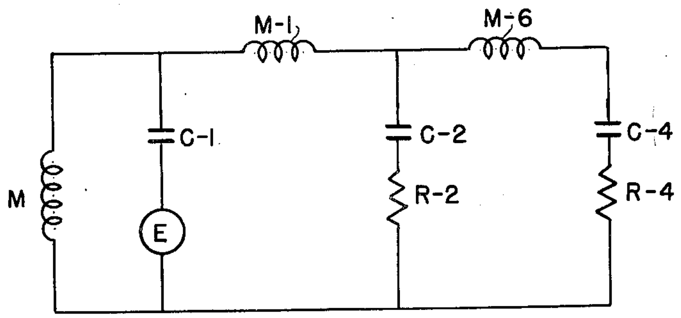
FIG. 14 is an analogous electric circuit of constants which represent the operative relationship of the elements of the bone receiver of FIGS. 12 and 13.

The operative relationship of the elastomer junction body 53–5 to the other elements of the bone receiver shown in FIGS. 12 and 13, may be represented by the electric circuit analogue of FIG. 14. In the circuit analogue of FIG. 14, mass elements M and M–1, driving force E, capacitance C–1, and mastoid impedance C–4, R–4, are identical with the similarly designated elements of the circuit analogue of FIG. 8 representing elements of the bone receiver of FIGS. 12 and 13 which are identical with those of the bone receiver transducer of FIGS. 1–10. The inductance M–6 represents the effective mass of the rigid casing 91 with its rigid body contact wall 93 (FIGS. 12, 13), and C–2 and R–2 are the compliance and mechanical resistance, respectively, of the elastomer junction body 53–5 through which the armature 47 or the bone-coupled part of the transducer is joined to the rigid casing 91.

By proportioning the compliance of the elastomer junction body 53–5 so that it vibrates with its own resonant frequency in the range between 2000 and 6000 c.p.s. relatively to the other elements of the transducer 40 when the bone-receiver casing 91 is held coupled to the user's bones, the bone receiver of FIGS. 12 and 13 will operate essentially as a mechanical band-pass filter having an attenuated response which rolls off smoothly above such resonant frequency, as explained in connection with the analogous elements of the bone receiver of FIGS. 1–10. By using an elastomer junction body 53–5 to provide a bone receiver of the type shown with the desired high-frequency cutting band-pass filter response, the desired cut-off of the undesirable high frequencies is secured without introducing undesirable peaked response in the frequency range corresponding to the resonant frequency of the filter mesh elements M–2, C–2 and R–2 of FIG. 14.

In accordance with a phase of the invention, an encased bone-conduction hearing aid which is detachably held on the temple-member rear end of an eyeglass frame of the type described above in connection with FIGS. 1–11, may be driven with more power without introducing sustained oscillations and whistling feedback action, while providing it with such simple spectacle support, by mounting all elements of the hearing aid except the microphone in a tiny detachable casing, with the microphone carried in the front region of the same temple or temple member near its pivotal junction to the eyeglass front frame which is held by the temples in the front of the user's eyes.

Figure 15:
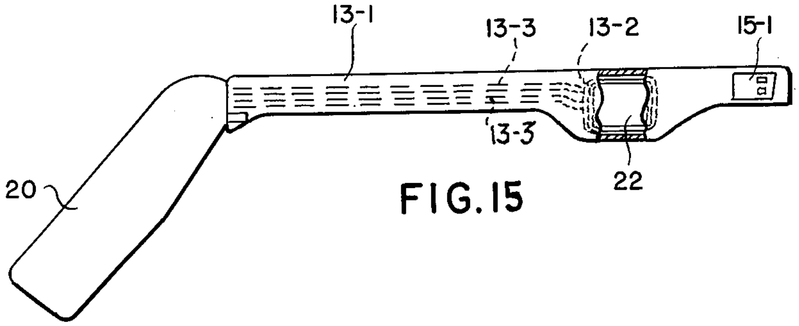
FIGS. 15 and 16 are side and top views of the temple part of another hearing aid of the invention.
Figure 16:
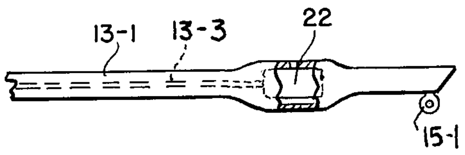

One form of such hearing aid will now be described in connection with FIGS. 15 and 16. A temple member 13–1 similar to the temple 13 of the eyeglass frame shown in FIG. 1, is joined by a pivot junction 15–1 to one of the side ends of the eyeglasses carrying front frame 14 (FIG. 1). To the rear end of the temple member, is detachably secured a hearing-aid casing 20 identical with the casing 20 of FIG. 1, carrying therein all the elements of an all-in-one hearing aid described in connection with FIG. 5, except for the microphone 22. Instead of being placed within the casing 20, the microphone is housed in a compartment 13–2 formed with a slightly enlarged front region of the temple 13–1 at a distance from the hearing-aid casing 20 and immediately adjacent to the front end of temple 13–1 or its junction to the eyeglass frame 14. The microphone 22 is of miniature size, and may be of the type described in the co-pending application of W. H. Knauert, Serial No. 774,438, filed November 17, 1958. The microphone compartment 32 may be of larger lateral dimensions than the miniature-sized microphone 22 so that the microphone may be held suspended therein by vibration-suppressing Z-shaped elastomer junction members, such as described in said Knauert application. The temple member 13–1 may be made in a conventional way, of relatively strong, solid and rigid synthetic resin material of the type generally used for similar conventional eyeglass temple members.

A compartment wall of the temple compartment 13–2 is provided with an opening through which exterior sound is propagated to the sound passage of the microphone 22 for causing it to generate corresponding electric signals supplied to the amplifier housed in the detachable casing 20. The temple 13–1 has affixed or embedded therein two conductors 13–3, through which the transducer coil of microphone 22 is connected to the input side of the transistor amplifier housed in the detachable casing 20 and operating in the manner described in connection with the circuit diagram of FIG. 5. The flat rear end of the temple 13–1 which is inserted into its casing seat—in which it is suitably secured, for instance in the manner described in connection with FIG. 3—may be provided at its two opposite narrow edge regions with tiny metallic terminal strips arranged in a conventional way for automatically establishing contact connections with adjacent electric socket terminals insulatingly positioned within the hearing-aid casing 20 for completing circuit connections from the microphone 22 to the transistor amplifier when the rear end of temple 13–1 is inserted into its mounting seat in the hearing-aid casing 20 attached thereto.

The features of the invention described above in connection with FIGS. 15 and 16, are also of value in connection with an air-conduction hearing aid wherein the casing 20 detachably held at the rear end of an eyeglass temple, has mounted therein all the elements of an air-conduction hearing aid, except the microphone, with the microphone being carried in a front compartment, such as compartment 13–2 of temple member 13–1, of FIGS. 15 and 16. In such air-conduction hearing aid, all other elements of the hearing-aid such as described in connection with FIG. 5, but having an air-conduction receiver instead of a bone receiver, are mounted in the unitary casing 20 detachably held at the rear end of the eyeglass temple 13–1, with the sound outlet of the air-conduction receiver connected by a tiny tubing to a coupling insert which is affixed to the user's ear canal for transmitting sound from the air-conduction receiver to the user's ear canal.

It should be noted that the features of the bone-conduction hearing aid described above in connection with FIGS. 1–11, are not limited to a hearing aid of the type described in connection with these figures or with the exemplifications of FIGS. 15 and 16, but are of value in other types of all-in-one hearing aids in which the microphone, transistor amplifier including its energizing battery, and the bone receiver, are carried by a mechanical support structure such as an eyeglass frame, which tends to propagate vibrations of a bone receiver carried on one part of such structure to other parts of such structure on which the microphone is mounted. Thus, in the case of an all-in-one bone-conduction hearing aid of the type shown in FIGS. 1 to 11, it may have an eyeglass frame of the type shown and described in Borg Patent 2,830,132, with the bone receiver carried on one temple member, the microphone on the other temple member, and the transistor amplifier and battery in either one of the two temples, or partially in one or partially in the other temple. Alternatively, one or the other temple of such eyeglass frame may be provided with a hollow compartment extending over its entire length, with the components of one complete hearing aid, such as described in connection with FIG. 5, distributed in one or in each of the two hollow temple compartments, with the bone receiver in the rear part of the hollow temple compartment overlying the mastoid bone behind the ear and carried therein in accordance with the invention as described above in connection with FIGS. 1–11.

It will be apparent to those skilled in the art that the novel principles of the invention disclosed herein in connection with specific exemplifications thereof, will suggest various other modifications and applications of the same. It is accordingly desired that in construing the breadth of the appended claims, they shall not be limited to the specific exemplifications of the invention described above.

I claim:

1. In a hearing aid, a support structure comprising a casing having an electro-mechanical vibratory transducer therein and having a wall with an opening therein, a cover for said opening secured to said wall and having a section of elastomer material, said transducer having a vibration transmitting armature connected to said elastomer section and said receiver being carried thereby, and said cover comprisinng means for bone conduction of vibration to a user, said elastomer section comprising the sole path of transmission of vibration from said armature to said latter means, said cover and casing having a resonant frequency of vibration of from 2,000 to 6,000 cycles per second and constituting a band pass filter in conjunction with said transducer operative to attenuate frequencies above said resonant frequency in bone coupled condition.

2. In a hearing aid, a support structure comprising a rigid casing having an opening, a wall of resilient elastomer material substantially covering said opening and being secured to said casing, said wall carrying on its exterior a bone contacting element, electromechanical vibratory receiver means within said casing comprising an armature carried by said wall and coupled thereto, said wall constituting the sole support for said receiver means and for said bone contacting element and also constituting the sole path of vibration transmission from said armature to said bone contacting element, the system comprising said casing, said wall and said bone contacting element having a resonant frequency of from 2,000 to 6,000 cycles per second and constituting a band pass filter in conjunction with said receiver means to cut off frequencies above said resonant frequency.

3. In a hearing aid, the combination of a support element comprising a rigid casing, an electromechanical vibratory sound receiver enclosed within said casing, a mounting element of elastomer material for said receiver secured to and carried by said casing, said receiver having an armature secured to said mounting element and fully supporting said receiver thereby and said elastomer mounting element effecting the sole means of transmission of sound from said armature, said casing having bone contacting means, the resonant frequency of the system which comprises said support element and said mounting element being within the range of 2,000–6,000 cycles per second, and said system constituting in conjunction with said receiver a band-pass filter operative to attenuate frequencies above said resonant frequency in bone coupled condition.

4. In a hearing aid, a casing having a wall of resilient elastomer material, said wall carrying bone contacting means, electro-mechanical vibratory receiver means within said casing comprising an armature carried by said wall and coupled thereto, said wall constituting the sole support for said receiver means and for said bone contacting means and also constituting the sole path of vibration transmission from said armature to said bone contacting means, the system comprising said casing and said bone contacting means having a resonant frequency of from 2,000 to 6,000 cycles per second and constituting a band-pass filter in conjunction with said receiver means to cut off frequencies above said resonant frequency.

5. In a hearing aid, a support structure comprising a casing having electro-mechanical vibratory transducer therein comprising an armature, said casing having a wall with an opening, cover means comprised of elastomer material substantially covering said opening and having securement to said wall around said opening and having a thickened central area extending into said opening and spaced from the periphery thereof, said cover means comprising bone contacting means disposed externally of said casing and adjacent said central area, means securing said armature to said thickened central area for effecting the sole support of said transducer and the sole path of transmission of vibration therefrom, said casing and said cover means having a resonant frequency of from 2,000 to 6,000 cycles per second and constituting in conjunction with said transducer a band-pass filter for attenuating frequencies above said resonant frequency.

6. In a hearing aid, a support structure comprising a rigid casing having a vibratory bone contacting means, a mounting element of resilient elastomer material within said casing and secured thereto, an electro-mechanical vibratory receiver within said casing and secured to said mounting element, said mounting element constituting the sole support for said receiver and also effecting the sole path of vibration transmission from said receiver to said casing, wherein said casing transmits said vibration to said bone contacting means, said casing and said bone contacting means and said mounting element having a resonant frequency of from 2,000 to 6,000 cycles per second and constituting in conjunction with said receiver a mechanical band-pass filter to cut off frequencies above said resonant frequency.

7. In a hearing aid, a support structure comprising a rigid casing having a vibratory bone contacting means, a mounting element of resilient elastomer material within said casing and secured thereto, an electro-mechanical vibratory receiver within said casing and having an armature secured to said mounting element, said mounting element constituting the sole support for said receiver and also effecting the sole path of vibration transmission from said armature to said casing, wherein said casing transmits said vibration to said bone contacting means, said casing and said bone contacting means and said mounting element having a resonant frequency of from 2,000 to 6,000 cycles per second and constituting in conjunction with said receiver a mechanical band-pass filter to cut off frequencies above said resonant frequency.

References Cited in the file of this patent

UNITED STATES PATENTS

| | | |
|---|---|---|
| 2,765,373 | Smith | Oct. 2, 1956 |
| 2,858,376 | Lewis | Oct. 28, 1958 |
| 2,874,230 | Carlson | Feb. 17, 1959 |
| 2,882,348 | Erickson | Apr. 14, 1959 |

FOREIGN PATENTS

| | | |
|---|---|---|
| 761,169 | Great Britain | Nov. 14, 1956 |